US00RE41116E

(19) United States
(12) Reissued Patent
Zimmerman et al.

(10) Patent Number: US RE41,116 E
(45) Date of Reissued Patent: Feb. 16, 2010

(54) GOLF CLUB WEIGHT

(75) Inventors: Gery Mel Zimmerman, Fallbrook, CA (US); Todd P. Beach, San Diego, CA (US); Joseph H. Hoffman, Carlsbad, CA (US); Robert Michael Nunez, San Pedro, CA (US); Craig Kevin Barez, Temecula, CA (US)

(73) Assignee: Taylor Made Golf Co., Inc., Carlsbad, CA (US)

(21) Appl. No.: 29/282,102

(22) Filed: Jul. 11, 2007

Related U.S. Patent Documents

Reissue of:
(64) Patent No.: Des. 515,165
Issued: Feb. 14, 2006
Appl. No.: 29/213,992
Filed: Sep. 23, 2004

(51) LOC (9) Cl. ..... 21-02
(52) U.S. Cl. ..... D21/789
(58) Field of Classification Search ..... D21/789, D21/793, 752, 759, 733; 473/343–346, 324–339, 473/297; D8/387
See application file for complete search history.

(56) References Cited

U.S. PATENT DOCUMENTS

| | | | | | |
|---|---|---|---|---|---|
| 1,518,316 | A | * | 12/1924 | Ellingham | 473/337 |
| 2,225,930 | A | * | 12/1940 | Sexton | 473/338 |
| 2,360,364 | A | * | 10/1944 | Reach | 473/338 |
| 3,064,980 | A | * | 11/1962 | Steiner | 473/335 |
| 3,466,047 | A | * | 9/1969 | Rodia et al. | 473/338 |
| 3,606,327 | A | * | 9/1971 | Gorman | 473/297 |
| 4,052,075 | A | * | 10/1977 | Daly | |

(Continued)

FOREIGN PATENT DOCUMENTS

JP 10-234902 * 9/1998

OTHER PUBLICATIONS

US 3,692,308, Sep. 1972, Glover (withdrawn).*

*Primary Examiner*—Mitchell I Siegel
(74) *Attorney, Agent, or Firm*—Sheppard, Mullin, Richter & Hampton LLP

(57) CLAIM

The ornamental design for a golf club weight, as shown and described.

DESCRIPTION

FIG. 1 is a first side perspective of an embodiment of a golf club weight in accordance with our new design.
FIG. 2 is a first side elevational view of the golf club weight of FIG. 1.
FIG. 3 is a second side elevation view of the golf club weight of FIG. 1.
FIG. 4 is a third side elevational view of the golf club weight of FIG. 1.
FIG. 5 is a fourth side elevational view of the golf club weight of FIG. 1.
FIG. 6 is a top plan view of the golf club weight of FIG. 1; and,
FIG. 7 is a bottom plan view of the golf club weight of FIG. 1.
The broken line showing is for illustrative purposes only and forms no part of the claimed design.

1 Claim, 4 Drawing Sheets

Matter enclosed in heavy brackets [ ] appears in the original patent, but forms no part of this reissue specification; matter printed in italics indicates the additions made by reissue.

(AMENDED)

U.S. PATENT DOCUMENTS 4,269,246 A * 5/1981 Larson et al.
4,754,977 A * 7/1988 Sahm
4,795,159 A * 1/1989 Nagamoto
4,869,507 A * 9/1989 Sahm
5,050,879 A * 9/1991 Sun et al.
5,171,117 A * 12/1992 Seidl
5,253,869 A * 10/1993 Dingle et al.
5,316,305 A * 5/1994 McCabe
5,320,005 A * 6/1994 Hsiao
5,385,348 A * 1/1995 Wargo
5,421,577 A * 6/1995 Kobayashi
5,431,401 A * 7/1995 Smith
5,571,053 A * 11/1996 Lane
5,746,664 A * 5/1998 Reynolds, Jr.
5,911,638 A * 6/1999 Parente et al.
5,935,019 A * 8/1999 Yamamoto
5,947,840 A * 9/1999 Ryan
5,967,905 A * 10/1999 Nakahara et al.
6,056,649 A * 5/2000 Imai
6,089,994 A * 7/2000 Sun
6,158,310 A * 12/2000 Goss et al.
6,379,265 B1 * 4/2002 Hirakawa et al.
6,524,198 B2 * 2/2003 Takeda
6,527,649 B1 * 3/2003 Neher et al.
6,612,936 B1 * 9/2003 Matias ..... 473/256
D482,092 S * 11/2003 Imamoto ..... D21/759
D482,093 S * 11/2003 Imamoto ..... D21/759
6,641,487 B1 * 11/2003 Hamburger
2002/0137576 A1 * 9/2002 Dammen
2002/0160854 A1 * 10/2002 Beach et al.
2005/0143192 A1 * 6/2005 Otoguro ..... 473/345

* cited by examiner

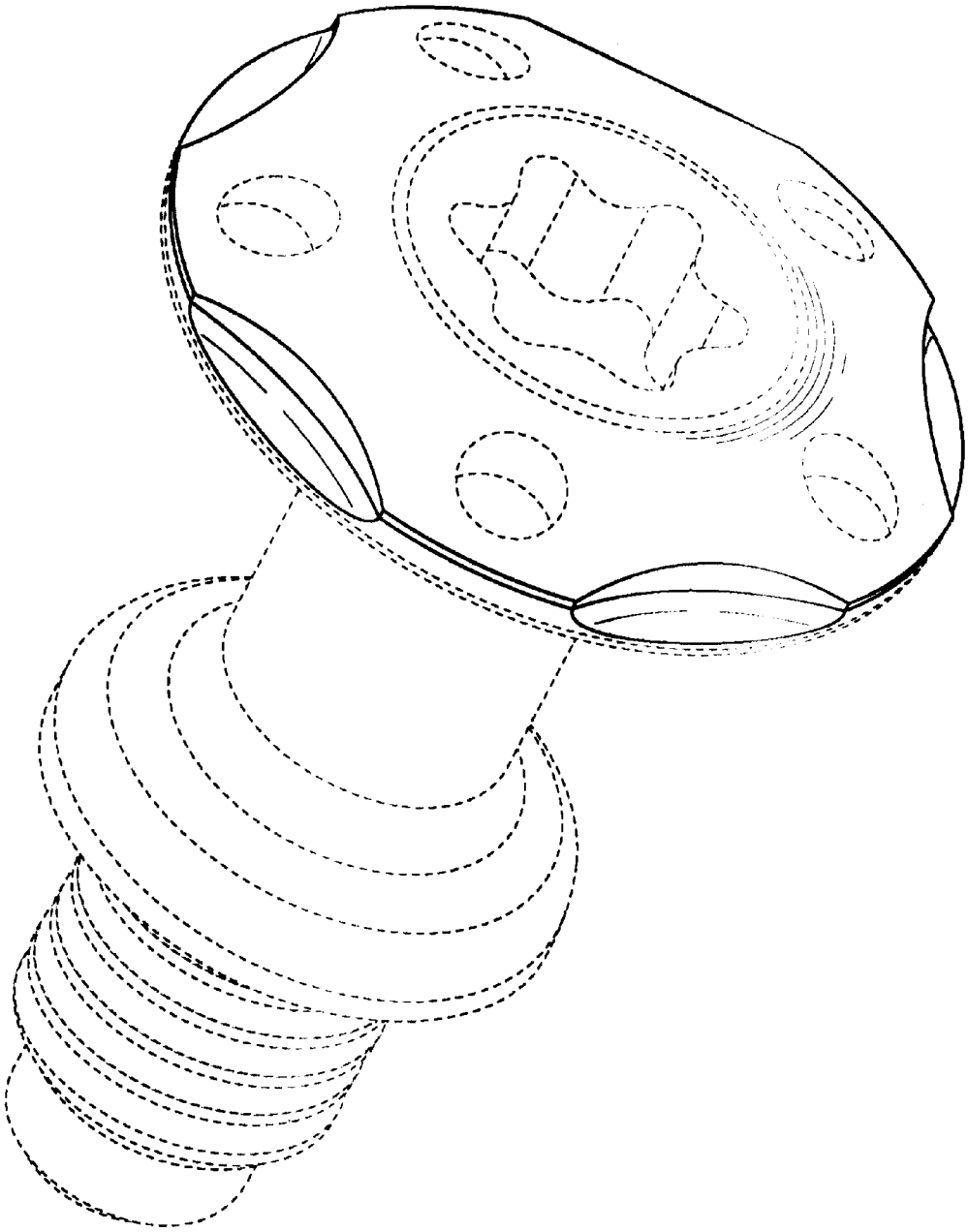
(AMENDED)
FIG. 1

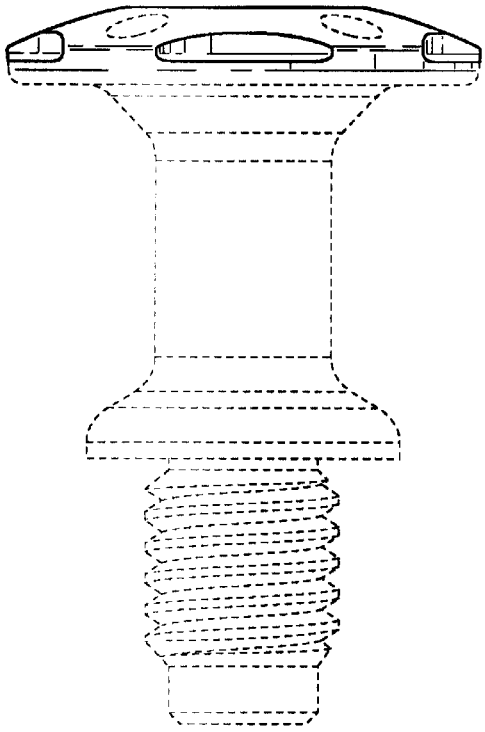
(AMENDED)
FIG. 2
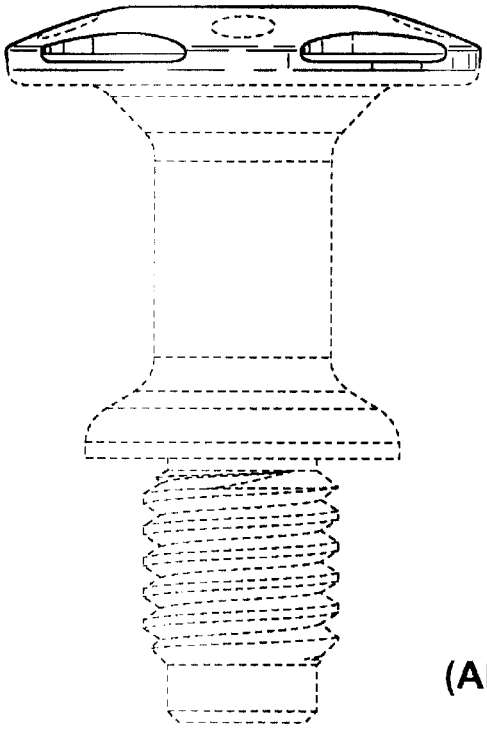
(AMENDED)
FIG. 3

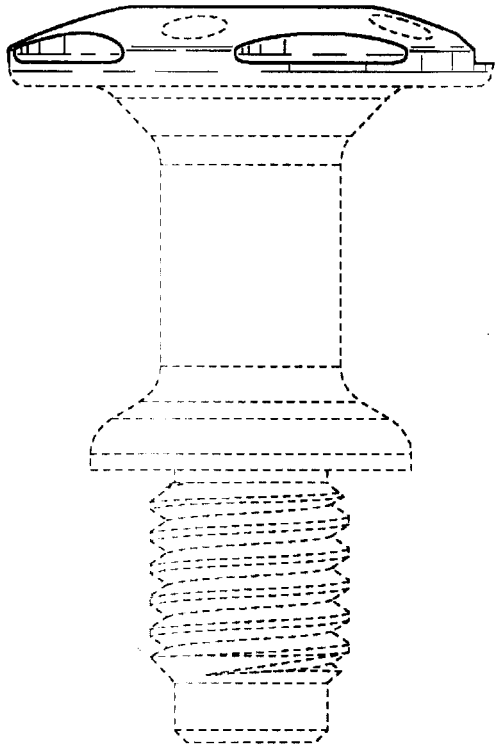
(AMENDED)
FIG. 4
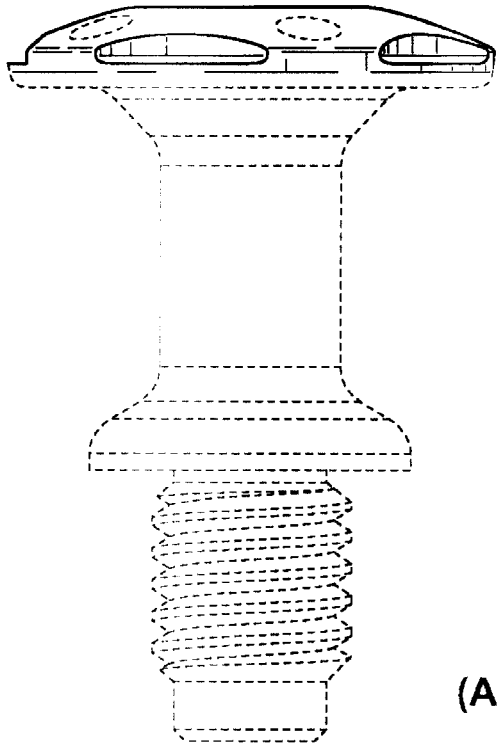
(AMENDED)
FIG. 5

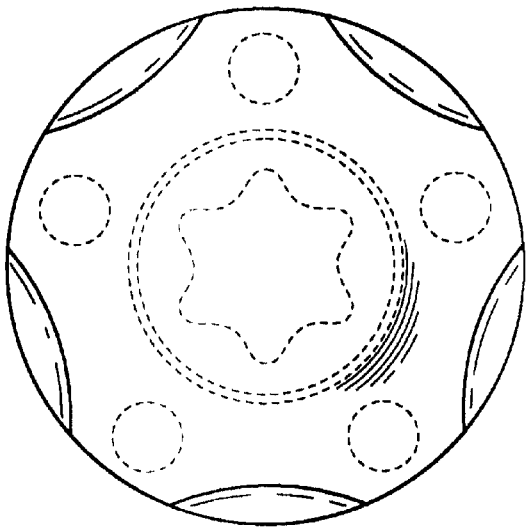
(AMENDED)
FIG. 6
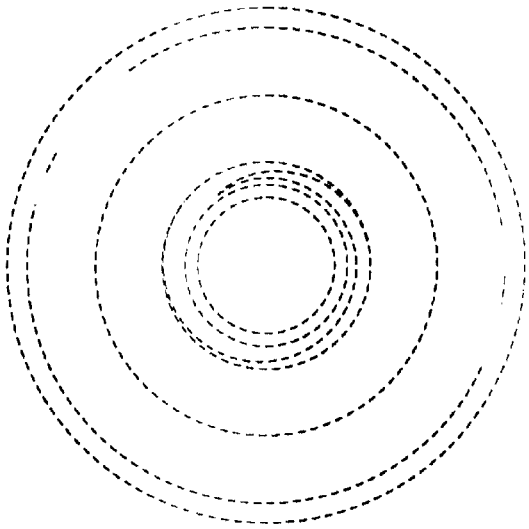
(AMENDED)
FIG. 7